May 2, 1944.  E. G. RAMBERG  2,347,965
ART OF ELECTRON MICROSCOPY
Filed Jan. 29, 1942
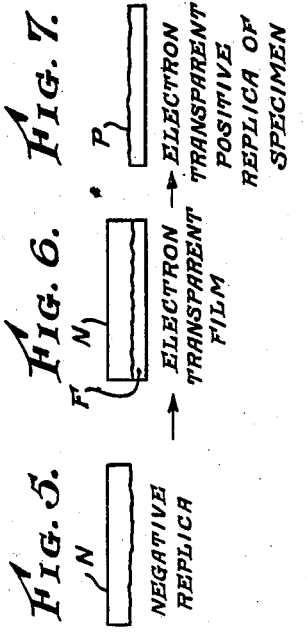
Inventor
Edward G. Ramberg
By CD Tuska
Attorney Patented May 2, 1944

2,347,965

UNITED STATES PATENT OFFICE 2,347,965

ART OF ELECTRON MICROSCOPY

Edward G. Ramberg, Feasterville, Pa., assignor to Radio Corporation of America, a corporation of Delaware Application January 29, 1942, Serial No. 428,667

9 Claims. (Cl. 250—49.5)

This invention relates to the art of electron miscroscopy and has for its principal object to provide a simple and reliable method of examining, with a conventional transmission-type electron microscope, specimens which are opaque to electrons.

Up to the present time the electron miscroscope has achieved its greatest successes in the observation of objects thin enough to transmit readily electrons incident with 50 to 100 kv. velocity; objects, like bacteria, viruses, smokes, thin films, which are materially less than 1 micron in thickness. The direct methods of observing surfaces of compact bodies have not, so far, led to comparable image quality at high magnifications. Among these direct methods may be mentioned:

(1) The observation of surfaces with the aid of thermionic electrons, photoelectrons, or secondary-electrons emitted from the surface with very small velocities.

(2) Surface observations with reflected electrons. Here the surface may be either normal to the viewing direction, or it may be nearly parallel to both the direction of observation and the direction of illumination. In the first case the wide velocity distribution of the reflected electrons makes high resolution impossible, while in the second case extreme fore-shortening and unequal resolution in two mutually perpendicular directions are serious drawbacks.

(3) Another method designed to accomplish the same purpose consists of scanning a small area of the surface with a very fine electron probe and reproducing the surface on the screen of a cathode-ray tube or some other type of recorder by the method of wired television. It is impossible to gauge, at the present time, the full range of application of this third method. Results published so far, while very promising, have not materially exceeded the capabilities of the light microscope.

In order to obviate the foregoing and other limitations of direct methods of surface observations, it has previously been proposed to adapt the standard transmission-type electron microscope to surface studies by preparing suitable replicas of the original surface, these replicas being thin enough to readily transmit 50 kv. electrons. One such procedure has been suggested by H. Mahl who floated aluminum oxide replicas of aluminum specimens off, after etching away the metal comprising the original specimen, with the aid of a saturated mercuric chloride solution.

Mahl has also mentioned the possibility of generalizing the method of using collodion films in place of oxide films, and prepared some negative replicas of aluminum surfaces using the aforementioned method for removing the film from the metal. In addition to destroying the specimen, this method has the drawback of leaving large quantities of impurities on the replica unless great care is taken in washing it. It is furthermore restricted to materials which can be dissolved without affecting the replica film, i. e. primarily metals.

Accordingly, another object of the present invention is to obviate the foregoing and other less apparent objections to presently known methods of making electron-transparent replicas.

Another and related object of the invention is to provide an extremely accurate, electron-transparent positive replica of the surface of an object, and to provide a simple and reliable method of making such positive replicas.

Other objects and advantages will be apparent and the invention itself will be best understood by reference to the following specification and to the accompanying drawing, wherein:

Fig. 1 shows, in sectional elevation, one form of an apparatus which may be used in carrying the invention into effect, Figs. 2 to 7, inclusive, comprise a schematic diagram of the several steps in the making of a transparent replica of an opaque specimen in accordance with the invention, and Fig. 8 is a schematic diagram of a conventional transmission type electron microscope.

In carrying the invention into effect, a layer L of metal, e. g., silver, of substantial thickness is deposited onto the surface S of the object O to be examined. This may be accomplished by thermal evaporation of a pellet 1 of the said metal which may be mounted for the purpose in a refractory metal filament 3 in a vacuum chamber 5 in which the said object is supported. Subsequently, this metal layer or film L is stripped mechanicaly from the surface S, yielding a negative metal replica N of the surface. If too thin for the stripping process the metal film L may be reinforced, as indicated at L' (Fig. 4), by electroplating, by a spray process, or otherwise. Next, a dilute solution of the final replica material, e. g. a 1 percent solution of collodion in amyl acetate, is flowed over the negative replica surface and is permitted to dry, thus forming an adherent coating or film F thereon. Then the negative metal replica N with the adhering thin film F is immersed for several hours in a suitable solvent for the metal, e. g. 2 to 3 normal nitric acid in the case of silver. At the end of this period the metal is completely dissolved and, after washing in distilled water, the residual positive replica P film may be placed on a fine-mesh screen, e. g. 250-mesh copper or stainless steel, which acts as the object support in the electron microscope.

The choice of metal to be used as the transfer medium is dictated primarily by the adhesion properties of the evaporated metal with respect to the surface to be studied, and by the ease of evaporating and dissolving it. Silver has been found very satisfactory in the case of steels, brass, aluminum, various alloys, and non-metallic substances. On the other hand, for a silver surface some other material, such as aluminum, would be required.

Fig. 8 shows the transparent positive replica P of Fig. 7 subjected to the electron beam of a conventional transmission type electron microscope. Here the electrons are focused upon and through the transparent positive replica P by a magnetic coil or "condenser lens" M, and the resulting electron image is projected by the "objective lens" M' upon a suitable target such, for example, as a fluorescent screen or photographic plate.

One basic advantage of the replica methods as compared to the direct methods of surface observation with the electron microscope remains to be pointed out. The density at any point of the picture of a positive replica is a direct measure of the height of that point with respect to a reference plane parallel to the surface. Ridges in the surface show as dark portions, depressions as bright portions of the image. Furthermore, if the exposure and the development procedure are standardized, image density can be correlated once and for all with replica thickness, so that the actual contour of any cross section of the surface imaged can be derived directly from the corresponding microphotometer record of the negative. The microscope is calibrated in advance by taking pictures either of superposed collodion films of known thickness or of evaporated films of known mass density.

What is claimed is:

1. In the art of electron microscopy, the method of utilizing an electron beam for the study of an electron-opaque surface, said method comprising making an electron-transparent positive replica of said opaque surface and thereafter subjecting said transparent positive replica to said electron beam whereby to produce an electron image of said replica.

2. Method of making a positive replica of a surface, said method comprising forming a negative replica of said surface, forming on the negative surface of said replica a positive replica constituted of a material which is immune to a substance which attacks the material of which said negative replica is constituted, and then subjecting said materials to said substance for a period sufficiently long to remove said negative replica from said positive replica.

3. Method of making a positive replica of the surface of an object, said method comprising forming a removable metallic negative replica on said surface, removing said metallic replica from said surface, forming on the negative surface of said metallic replica a positive replica constituted of a material which is immune to a solvent for the metallic material of which said negative replica is comprised, and then subjecting said materials to said solvent for a period sufficiently long to remove said negative replica from said positive replica.

4. Method of making a positive replica of the surface of an object, said method comprising forming a film-like metallic negative replica on said surface, reinforcing the exposed surface of said metallic replica, removing said reinforced negative metallic replica from said surface, forming on the negative surface of said metallic replica a positive replica and thereafter dissolving and removing said negative replica from said positive replica.

5. The invention as set forth in claim 4 and wherein said negative metallic replica is reinforced by electroplating it.

6. The invention as set forth in claim 4 and wherein said film-like negative metallic replica is formed on said surface in vacuo by thermal evaporation.

7. Method of making a positive replica of a ferrous metal surface, said method comprising forming on the said ferrous surface a silver film, stripping said silver film from said ferrous surface, forming on the negative surface of said silver film a positive replica constituted of a substance which is immune to an acid which attacks silver, and then subjecting said silver film to the action of said acid for a period sufficiently long to remove said silver from said positive replica.

8. Method of making a positive replica of a surface constituted of silver, said method comprising forming on the said surface an aluminum film, stripping said aluminum film from said surface, forming on the negative surface of said aluminum film a positive replica constituted of a substance which is immune to a solvent for aluminum, and then subjecting said aluminum film to the action of said solvent for a period sufficiently long to remove said aluminum from said positive replica.

9. As a new article of manufacture for use in a transmission type electron microscope in the examination of the surface characteristics of an object which is opaque to electrons, said article comprising a film-like structure constituted of a substance which is transparent to electrons and comprising a positive replica of the surface of said electron opaque object.

EDWARD G. RAMBERG.